(12) United States Patent
Kvache

(10) Patent No.: US 9,038,110 B2
(45) Date of Patent: May 19, 2015

(54) SYSTEM AND METHOD FOR VIEWING A TV PROGRAM GUIDE ON A MOBILE DEVICE BACKGROUND

(75) Inventor: Alexander Kvache, Brookline, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 337 days.

(21) Appl. No.: 11/605,802

(22) Filed: Nov. 28, 2006

(65) Prior Publication Data

US 2008/0127257 A1 May 29, 2008

(51) Int. Cl.
| | |
|---|---|
| H04H 60/72 | (2008.01) |
| H04H 60/76 | (2008.01) |
| H04M 1/725 | (2006.01) |
| H04H 20/57 | (2008.01) |
| H04N 5/445 | (2011.01) |
| H04N 7/16 | (2011.01) |
| H04N 21/235 | (2011.01) |
| H04N 21/414 | (2011.01) |
| H04N 21/482 | (2011.01) |

(52) U.S. Cl.
CPC .......... *H04M 1/72525* (2013.01); *H04H 20/57* (2013.01); *H04H 60/72* (2013.01); *H04H 60/76* (2013.01); *H04N 5/44543* (2013.01); *H04N 7/165* (2013.01); *H04N 21/2355* (2013.01); *H04N 21/41407* (2013.01); *H04N 21/482* (2013.01); *H04N 21/4828* (2013.01)

(58) Field of Classification Search
USPC ....................................................... 725/48, 62
See application file for complete search history.

(56) References Cited

U.S. PATENT DOCUMENTS

| | | | | |
|---|---|---|---|---|
| 5,432,946 | A * | 7/1995 | Allard et al. .................. | 713/310 |
| 5,600,573 | A * | 2/1997 | Hendricks et al. ............ | 725/109 |
| 6,721,578 | B2 * | 4/2004 | Minear et al. ................. | 455/566 |
| 6,774,926 | B1 * | 8/2004 | Ellis et al. .................. | 348/14.01 |
| 6,981,045 | B1 * | 12/2005 | Brooks ......................... | 709/226 |
| 6,993,783 | B2 | 1/2006 | Kai | |
| 2002/0004799 | A1 * | 1/2002 | Gorelik et al. ................ | 707/201 |
| 2002/0016964 | A1 * | 2/2002 | Aratani et al. ................. | 725/39 |
| 2003/0149978 | A1 * | 8/2003 | Plotnick ......................... | 725/39 |
| 2006/0021883 | A1 * | 2/2006 | Focke et al. .................... | 206/273 |
| 2006/0031883 | A1 * | 2/2006 | Ellis et al. ..................... | 725/58 |
| 2006/0174307 | A1 * | 8/2006 | Hwang et al. ................ | 725/132 |
| 2006/0253874 | A1 * | 11/2006 | Stark et al. ..................... | 725/62 |
| 2008/0022335 | A1 * | 1/2008 | Yousef .......................... | 725/100 |

* cited by examiner

*Primary Examiner* — Cai Chen

(57) ABSTRACT

A system and methods for providing an interactive program guide (IPG) to a mobile device are disclosed. The system generally includes a network component which receives IPG data including program data, and a mobile device application component which receives program data from the network component and displays the program data on the mobile device. The methods may include providing a mobile IPG application to a mobile device, receiving IPG data including program data with a network component, transmitting the program data from the network component to the mobile device, and formatting the program data for the mobile device.

32 Claims, 6 Drawing Sheets

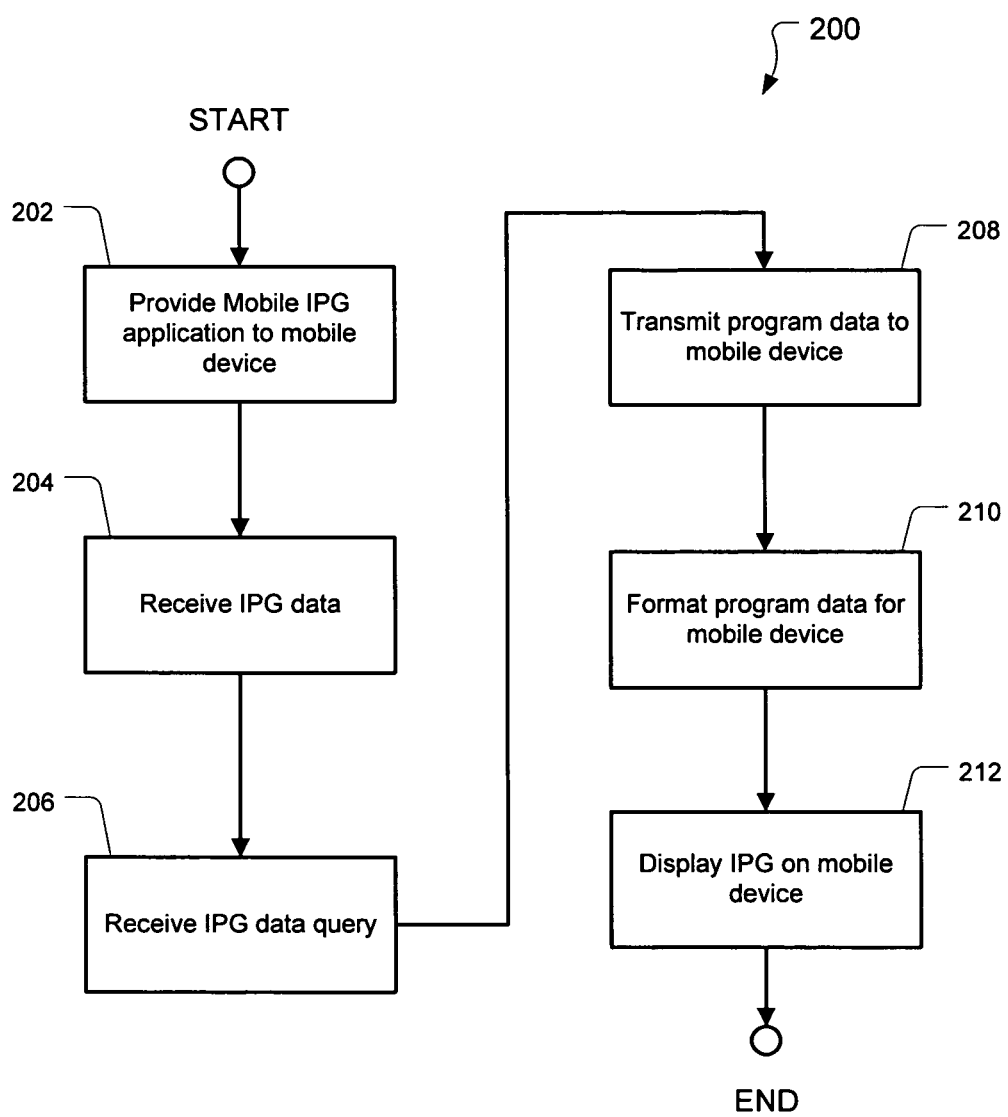

SYSTEM AND METHOD FOR VIEWING A TV PROGRAM GUIDE ON A MOBILE DEVICE

BACKGROUND

BACKGROUND

Wired (e.g., cable or fiber) and wireless (e.g., satellite) television (TV) service providers typically provide an interactive program guide (IPG) as part of their TV package for consumer end-users. Such packages may include a mixture of audio-visual, audio, visual and even text-based offerings. IPGs generally provide a listing of programs available on TV channels offered by the TV service provider, and enable users to submit queries for desired program information. For example, a user may submit a search query for a specific program, actor, time slot, etc., and the IPG will return a list of results matching the query. IPGs are generally accessible through set-top boxes (STBs) provided to customers by the service provider. The STBs typically download IPG data describing a schedule of programs for available channels from servers in selective communication with the STB. Under some circumstances the servers may additionally be accessible from the Internet, to allow websites to download IPG data from the servers so a user may view and submit queries to an IPG with a computer.

While IPGs may be conveniently viewed within a web browser on a full-scale computing system, e.g., a laptop or desktop computer, several drawbacks are inherent in IPGs when viewed on a mobile device such as a wireless phone or handheld computer. For example, mobile devices typically offer a smaller screen and less computing power than full-scale computer systems, limiting the amount of data which may be presented to the user at once. The limited computing resources afforded by most mobile device also generally means that browsers provided on mobile devices cannot persist user data locally on the device. Mobile devices typically rely upon plain HTML browsers, which may have difficulty displaying such large amounts of complex data typical of IPGs. Accordingly, mobile devices are generally not suitable for viewing IPGs.

BRIEF DESCRIPTION OF THE DRAWINGS

FIG. 8 illustrates an exemplary process for providing an IPG on a mobile device.

DETAILED DESCRIPTION

Systems and methods for providing an IPG to a mobile device are disclosed. An exemplary system may generally include a network component that receives IPG data from at least one IPG data server, and a mobile client application component in communication with the network component, which receives program data from the network component and displays the program data on a mobile device. A network component may also provide a platform by which a mobile client application is stored for downloading to a mobile device. Any mobile device capable of running a mobile client application, e.g., a downloadable binary execution module, and establishing a connection to an applicable communication (e.g., telecommunications) network may be employed as part of a system. A network component may generally receive IPG data from an IPG data server which includes program data decoupled from presentation logic data, e.g., data describing how program data may be presented in an IPG. A mobile client application component may transmit IPG data queries to a network component, which responds to the query with program data. The application component receives IPG program data from the network component and displays the program data in a format suitable for the mobile device. The network component may include a mobile IPG database manager and a Web Services Interface (WSI) for communicating with the mobile device, as will be described further below.

Figure 1:
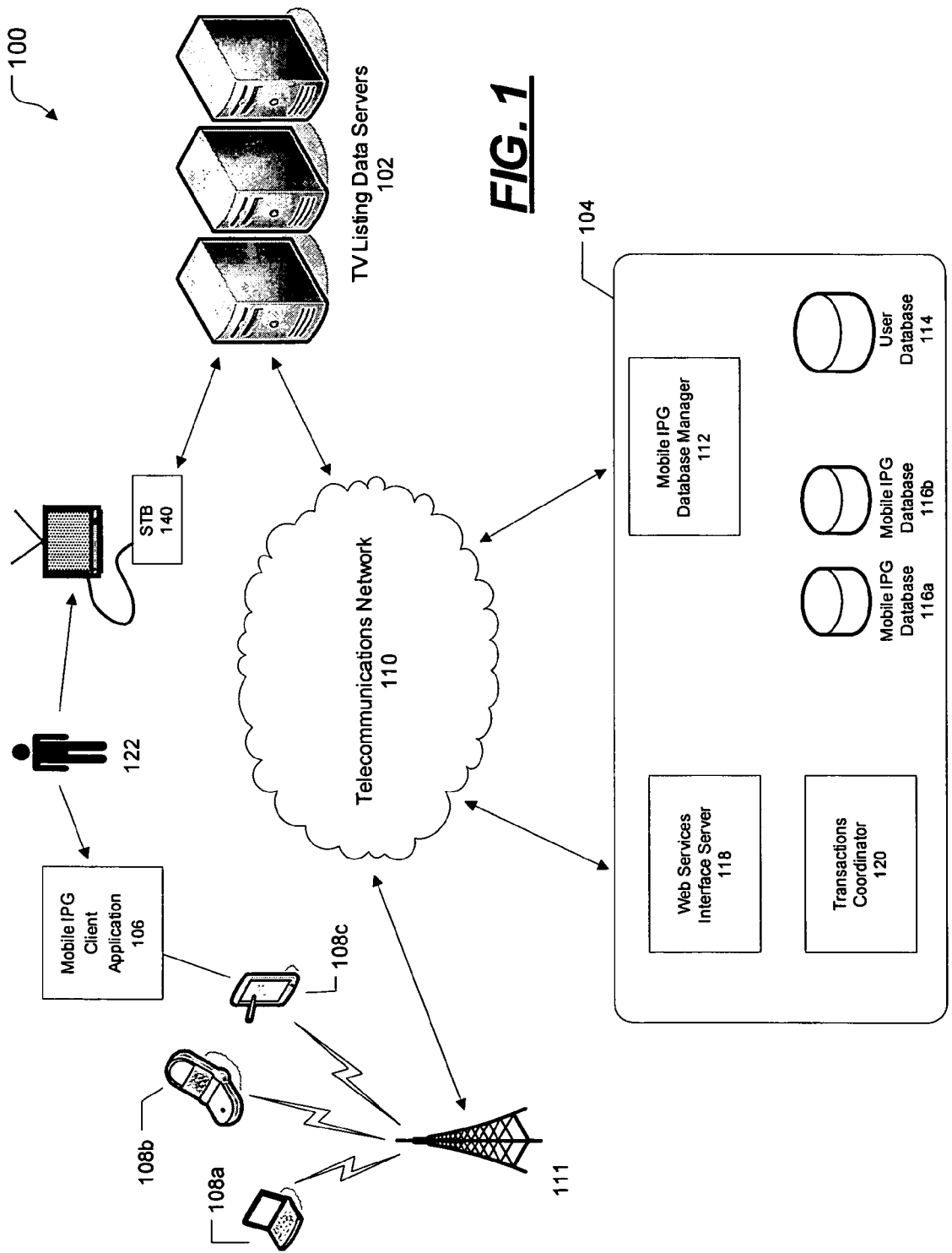
FIG. 1 illustrates an exemplary architecture of a system for providing an IPG over a mobile device.

Turning now to FIG. 1, an exemplary system 100 for providing an IPG to a mobile device is illustrated. System 100 generally includes a network component such as mobile IPG data provider 104, and a mobile application component such as mobile IPG client application 106. Mobile IPG client application 106 may be stored on mobile IPG data provider 104 and downloaded to any mobile device 108, as further described below. Mobile IPG data provider 104 generally receives IPG data from at least one IPG data server, e.g., television listing data server 102, and transmits program data to mobile client application 106 in response to queries submitted by mobile client application 106.

TV listing data server 102, mobile IPG data provider 104, and mobile devices 108 may be in communication over a communication (e.g., telecommunications) network 110. Network 110 may be any appropriate type of network including, for example, a packet-switched network, such as an internet protocol (IP) network, and/or a circuit-switched network. Accordingly, it is to be understood that network 110 may include switches, links, routers, gateways, etc. as necessary to facilitate the transmission of data between various computer and mobile devices. A plurality of mobile devices 108a, 108b, and 108c may be in communication with a communication tower 111 that links mobile devices 108a, 108b, and 108c to mobile IPG data provider 104 over network 110, as is well known. While three mobile devices 108a, 108b, 108c and one tower 111 are shown in FIG. 1, it is to be understood that at any one time there may be a great number of mobile devices 108 that communicate with mobile IPG data provider 104 as well as additional towers 111. Moreover, tower 111 is used in a generic sense, and could include other devices that may house two-way transmitting mechanisms, such as a satellite, for example. Moreover, FIG. 1 should not be interpreted to suggest that there is necessarily any geographic limitation to system 100. In fact, system 100 may facilitate communication between mobile devices 108 and mobile IPG data provider 104 across cities, states, and even countries.

An TV listing data server 102 generally assembles and stores IPG data for a variety of devices that may be used to view an IPG, e.g., mobile device 108, an STB/TV combination 140, or a full-scale laptop or desktop computer (not shown). IPG data generally includes program data. Program data includes information regarding various programs offered on channels provided by TV service provider. IPG data may be downloaded from TV listing data server 102 periodically, e.g., once a day, by TV and STB 140, allowing TV users 122 to view an IPG as part of a provider offered TV package. TV listing data server 102 generally includes IPG data for a period of time, e.g., for a two-week time period from a current day, for various TV channels offered by the TV service provider. An IPG may contain, for example, information about network and non-network TV stations, programs, and schedules, in the form of, for example, a set of files bundled together as addressable, accessible data structures. These data files may contain information regarding programs provided on a variety of channels offered by a TV service provider. These files may also contain information identifying a master facility of a TV service provider, i.e., a video headend (not shown), for receiving, processing, and distributing by way of wired or wireless system transmitted TV signals to STB and TV 140. The STB and TV 140 may be separate components or combined into a single device. Generally, a video headend may receive IPG data from TV listing data server 102 and distribute the IPG to a STB of an end user. TV listing data server 102 may provide a single source of IPG data for mobile IPG data provider 104 and STB/TV 140, thereby assuring that an IPG viewed through mobile device 108 or STB and TV 140 contains at least a sub-set of and preferably generally identical information as an IPG viewed on the other devices.

Mobile IPG data provider 104 may be in communication with TV listing data server 102 over network 110. Mobile IPG data provider 104 generally retrieves IPG data, including program data, from TV listing data server 102. Mobile IPG data provider 104 may retrieve IPG data periodically, e.g., once every 24 hours, similar to STBs and computers used to view IPGs. Mobile IPG data provider 104 generally provides program data which is decoupled from presentation logic data to a mobile IPG client application 106 in a format which may be easily presented by IPG client application 106 to user 122. Accordingly, a user 122 may conveniently view an IPG with any mobile device 108 in communication with mobile IPG data provider 104 over network 110.

Mobile IPG data provider 104 may include one or more known computing devices, including, without limitation, a computer workstation, a desktop, notebook, laptop, or handheld computer, or some other known computing device. Computing devices such as the foregoing may employ any of a number of known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices in various embodiments such as mobile IPG data provider 104 may each include instructions executable by one or more computing devices such as those listed above. Such instructions may be compiled or interpreted from computer programs created using a variety of known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

One exemplary representation of mobile IPG data provider 104 is illustrated in FIG. 1. Mobile IPG data provider 104 may include a variety of components such as a mobile IPG database manager 112, a user database 114, a mobile IPG database 116, a services interface 118 (e.g., a web services interface), and a transaction coordinator 120. While multiple databases are illustrated, it is recognized, however, that in some approaches a combined database may be appropriate so long as the discussed functionality is available.

Mobile IPG database manager 112 generally retrieves IPG data including program data from TV listing data server 102 and populates mobile IPG database 116 with the program data. Mobile IPG database manager 112 may preferably download IPG data over a secure data connection, e.g., hypertext transfer protocol (HTTP) interaction over an encrypted Secure Sockets Layer (SSL) or Transport Layer Security (TLS) transport mechanism, e.g., HTTPS. Downloads may be performed automatically on a periodic basis, e.g., once every 24 hours, or may be initiated manually by an administrator (not shown) of mobile IPG data provider 104. After downloading IPG data, mobile IPG database manager 112 generally decompresses and parses the IPG data to populate the mobile IPG database 116 with program data.

Figure 2:
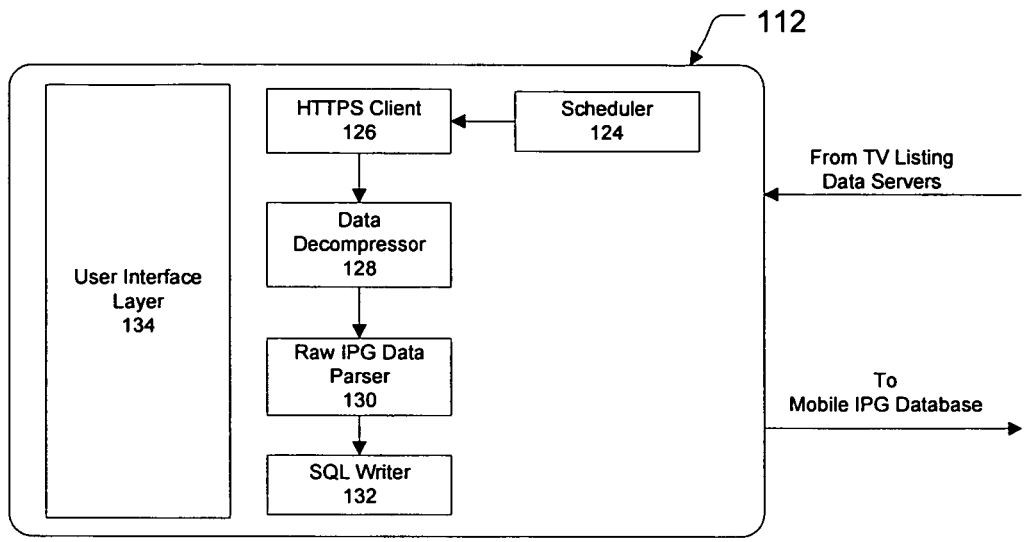
FIG. 2 illustrates an exemplary mobile IPG database manager.

Mobile IPG database manager 112 may include various hardware and/or software components that carry out the general functions of the mobile IPG database manger 112 described above. For example, one exemplary mobile IPG database manager 112 is illustrated in FIG. 2 having a scheduler 124, an HTTPS client 126, data decompressor 128, raw IPG data parser 130, SQL writer 132, and user interface layer 134. Scheduler 124 may include a memory for storing a schedule for mobile IPG database manager 112 to download current IPG data from TV listing data server 102, wherein scheduler 124 automatically initiates periodic downloads by prompting mobile IPG database manager 112. HTTPS client 126 may generally allow mobile IPG database manager 112 to communicate with TV listing data server 102 via a secure connection over communication network 110. Data decompressor 128 decompresses IPG data received from TV listing data server 102, and transmits decompressed IPG data to raw IPG data parser 130. Raw IPG data parser 130 generally parses raw IPG data into an internal data structure. Mobile IPG database manager 112 may additionally include Structured Query Language (SQL) writer 132, which generally formats program data into a desired format for storing in mobile IPG database 116. User interface layer 134 generally provides an interface between mobile IPG database manager 112 and mobile IPG client application 106, such that a an administrator (not shown) may determine or adjust a download schedule of scheduler 124, view an update status of mobile IPG database 116, and view an update history of IPG databases 116a, 116b (shown in FIG. 1).

Mobile IPG database manager 112 may be in selective communication with multiple mobile IPG databases 116a, 116b of mobile IPG data provider 104. Each mobile IPG database 116a, 116b and the like may serve as a backup database for the others to ensure generally uninterrupted availability of program data. For example, mobile IPG database 116b may provide IPG program data to mobile IPG client application 106 while mobile IPG database 116a is being updated with current IPG program data, as will be described further below. After mobile IPG database 116a is updated, mobile IPG database manager 112 may indicate that mobile IPG database 116a contains current program data. Accordingly, at least one mobile IPG database 116 is generally always available, and contains current IPG program data, e.g., a headend table, a program description table, channel lineup tables, and schedule tables.

Mobile IPG data provider 104 may include user database 114, which may store information about a registered user 122. Such information may include a Universally Unique Identifier (UUID) associated with user 122, information identifying a mobile device 108c associated with user 122, e.g., a telephone number, or any other identifying information of user 122, e.g., home address, home time zone, video headend identifier, cable or satellite subscription package, etc. User database 114 may also store a master copy of mobile IPG client application Mobile IPG client application 106 in various formats compatible with a variety of operating systems associated with mobile devices 108a, 108b, and 108c. Accordingly, user 122 may download a version of mobile IPG client application 106 which is specific to a particular mobile device 108. Mobile IPG client application 106 will be described further below.

User database 114 and mobile IPG databases 116a, 116b may generally include a structured file (e.g., comma delimited, tab delimited, etc.) or a relational database management system (RDBMS). An RDBMS generally employs the well known Structured Query Language (SQL) in addition to a language for creating, storing, editing, and executing stored procedures. However, it is to be understood that any one of databases 114, 116 may be some other kind of database such as a hierarchical database, a file, a set of files, an application database in a proprietary format, etc. Databases 114, 116 generally include a computing device employing a computer operating system such as one of those mentioned above, and are accessible via a desired networking technology such as a local area network (LAN), wide area network (WAN), etc. This organization of mobile IPG database 116 is preferably designed for fast, read-only access and is optimized to support various query types from mobile IPG client application 106, as will be described further below.

A web services interface (WSI) 118 of mobile IPG data provider 104 may generally act as an intermediary between mobile IPG client application 106 and mobile IPG database 116. When a user 122 enters a query requesting program data using mobile IPG client application 106, as will be described further below, WSI 118 may retrieve program data from mobile IPG database 116 and transmit a response including requested program data, wherein the response is provided in a format which may be conveniently presented by mobile IPG client application 106 for user 122.

Figure 3:
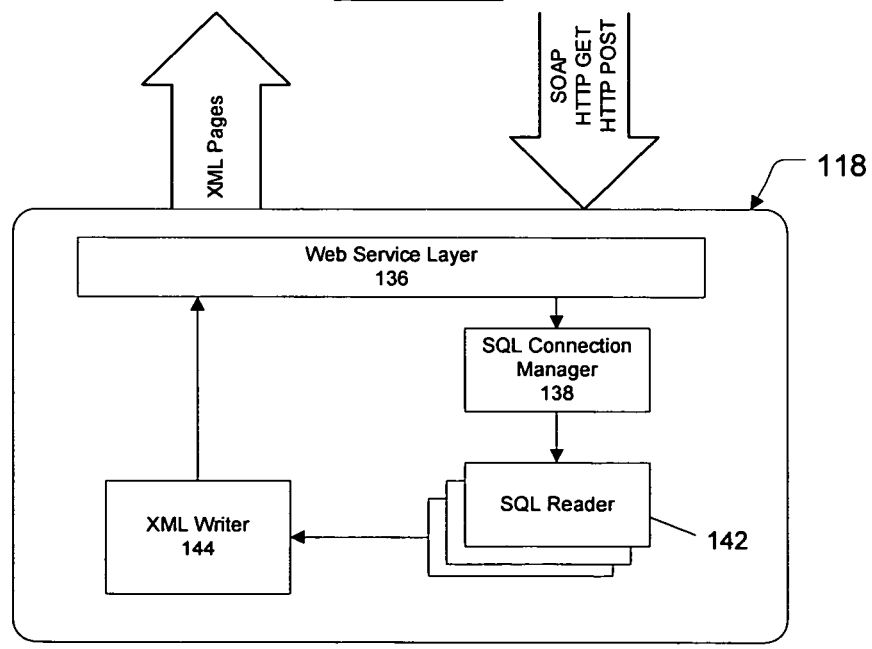
FIG. 3 illustrates an exemplary mobile IPG client application.

WSI 118 may include various hardware and/or software components which carry out the general functions of WSI 118 described above. One example of a possible WSI 118 is illustrated in FIG. 3 having a web service layer 136, an SQL connection manager 138, an SQL reader 142, and an XML writer 144. Web service layer 136 may parse a query received from mobile IPG client application 106. WSI 118 generally provides an IPG in an XML format that is viewable by mobile device 108 with mobile IPG client application 106. Other formats may be employed in place of XML, as may be convenient for various embodiments of mobile IPG client application 106. Queries received from mobile IPG client application 106 may include Simple Object Access Protocol (SOAP) commands, and/or HTTP GET and HTTP POST commands. In response, WSI 118 may query user database 114 and mobile IPG database 116 to provide a response in a format viewable over mobile device 108.

As an example, WSI 118 may retrieve information associated with user 122, e.g., a video headend ID associated with a UUID of user 122, a home time zone of user 122, etc., from user database 114. Such information may be entered by user 122 when registering with mobile IPG data provider 104, and/or downloading mobile IPG client application 106, as described above for user database 114. After mobile IPG client application 106 transmits a query to WSI 118, WSI 118 may construct a request for mobile IPG database 116 to retrieve program data in response. SQL connection manager 138 may maintain a plurality of connections with user database 114 and mobile IPG database 116, to optimize transmission of data therebetween. WSI 118 may obtain a database connection from a SQL connection manager 138 and submit a request via a SQL reader 142 to mobile IPG database 116. WSI 118 may employ an XML writer 144 to create a resultant XML document, which web service layer 136 transmits to mobile IPG client application 106. WSI 118 may adjust IPG program data for mobile device 108, such that an IPG is displayed on mobile device 108 in a home time zone of user 122, to ensure consistency when user 122 is viewing an IPG over mobile device 108 while in a different time zone than a home time zone of user 122, e.g., where STB and TV 140 is located.

Transaction coordinator 120 generally ensures uninterrupted availability of mobile IPG data provider 104 by maintaining at least two mobile IPG databases 116a, 116b, as described above. To eliminate unavailability of mobile IPG data while the primary mobile IPG database is being updated, transaction coordinator 120 may use a backup mobile IPG database 116b for responding to IPG requests while mobile IPG database 116a is being updated with IPG data from TV listing data server 102. Transaction coordinator 120 may receive a notification from mobile IPG database manager 112 when a primary mobile IPG database 116a is being updated, i.e., when mobile IPG database manager 112 begins an update of a primary mobile IPG database 116a. During this time, transaction coordinator 120 may re-route database queries to backup mobile IPG database 116b. When mobile IPG database manager 112 completes an update of primary mobile IPG database 116a, transaction coordinator 120 may redirect queries back to mobile IPG database 116a, and initiate an update of backup mobile IPG database 116b.

Figure 4:
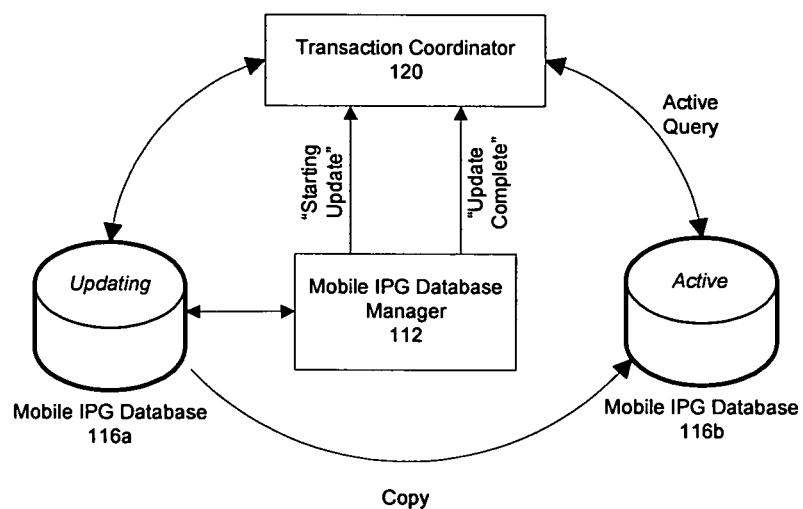
FIG. 4 illustrates an exemplary web services interface.

The general operation of transaction coordinator 120 is shown in FIG. 4, according to an exemplary embodiment. Mobile IPG database manager 112 may notify transaction coordinator 120 that a primary mobile IPG database 116a is initiating an update. Transaction coordinator 120 signals SQL connection manager 138 of WSI 118 (see FIG. 3) that primary mobile IPG database 116a is unavailable. Accordingly, SQL connection manager 138 creates a new connection to backup mobile IPG database 116b and deactivates a connection to primary mobile IPG database 116a. Therefore, all subsequent requests generated by WSI 118 will be routed to backup mobile IPG database 116b. After mobile IPG database manager 112 finishes updating primary mobile IPG database 116a, mobile IPG database manager 112 may send a notification to transaction coordinator 120. Transaction coordinator 120 may then prompt SQL connection manager 138 to re-activate a connection for primary mobile IPG database 116a and to deactivate a connection to backup mobile IPG database 116b.

Mobile IPG client application 106 is a software module specific to an operating system (OS) of mobile device 108. Mobile IPG client application 106 generally provides a platform on mobile device 108 through which user 122 may interact with WSI 118. Mobile IPG client application 106 may be downloadable to mobile device 108 from any network component, e.g., a server provided as part of mobile IPG data provider 104. As an example, mobile device 108 may download mobile IPG client application 106 directly over a wireless connection. Alternatively, mobile IPG client application 106 may be downloaded from user database 114 with a desktop computer (not shown) in communication with network 110, and then loaded onto mobile device 108 via a wired connection or "dock" connecting mobile device 108 to the desktop computer.

Mobile IPG client application 106 may be used to submit a query to mobile IPG database 116 for TV programming information. A query is a request for the IPG information initiated from the device. A variety of query types may be supported by mobile IPG client application 106, and may depend in part upon a screen size of mobile device 108 and a complexity of GUI primitives supported by an operating system of the mobile device 108. For example, representative data queries may include:

Available Channel Query: returns a list of channels available for a particular subscription package for user 122. A subscription package may be selected by user 122 through mobile IPG client application 106, determining what channels are displayed to user 122. Each channel may be associated with a channel number, station short name (CNN, HBO, etc.) and station description ("Arts & Entertainment", "Turner Classic Movies", etc.), as is generally known. A result for an available channel query according to an embodiment is shown in FIG. 6(a).

All Channels Query: returns a list of all channels available from a TV service provider, regardless of a particular subscription of user 122.

Favorites Query: returns a collection of channels, show titles and actors preferred and specified by a user. Favorites may be entered manually by user 122 and persist on mobile device 108 in a local data store 150. For example, user 122 may specify a query seeking particular programs, channels, or actors appearing in various programs to return a listing of programs matching the query.

Channel Schedule Query: returns a collection of program names, and may also include a start time and/or an end time for each program for a channel specified in a query. A result for a channel schedule query according to an embodiment is shown in FIG. 7(a).

Program Details Query: returns information about a program specified in a query. For example, a program title (official name by which a movie, show, episode or sports event is known), mature content advisory, category or genre, language, ratings, cast, verbal description of the show, episode or movie content may be returned in response to a query specifying a particular program. Results for a program details query according to two embodiments are shown in FIGS. 6(b) and 7(d).

Title Search Query: returns a collection of programs matching a query which includes a search string, e.g., a partial or full name of a program. Each item in the collection may includes a start and end time of a program, channel number, station short name and episode title. A title search query entry screen and a result for a title search query according to an embodiment are shown in FIGS. 7(b) and 7(c), respectively.

Actor Search Query: returns a collection of programs matching a query which includes a search string, e.g., a partial or full name of an actor. Similar to the title search query described above, each item in the collection may includes a start and end time of a program, channel number, station short name and episode title. An actor search query entry screen and a result for an actor search query according to an embodiment are shown in FIGS. 6(c) and 6(d), respectively.

Further, any other known query type may be used in addition or as an alternative to the queries specified above. For a query which returns schedule information, e.g., a title search query, user 122 may specify a time span to narrow the search. For example, a title search query may include a specific date along with a show title. The result of such a query will generally include all matching programs that run on the specified date. Where a mobile device 108 is employed that supports rich GUI primitives such as a data grid or tabular controls, or where mobile device 108 has a display screen of sufficient size, queries may be organized to retrieve a TV Guide summary as tabular data.

Any mobile device 108 having an operating system (OS) capable of initiating and maintaining an HTTP data connection, an Application Program Interface (API) for a Graphical User Interface (GUI), and a local data storage may be utilized by user 122. Examples of known operating systems which may be employed include BREW, Windows CE, Palm, Symbian, and J2ME mobile devices, as non-limiting examples. Mobile IPG client application 106 generally creates HTTP SOAP, HTTP GET or HTTP POST commands, as are well known, to submit queries to WSI 118.

Figure 5:
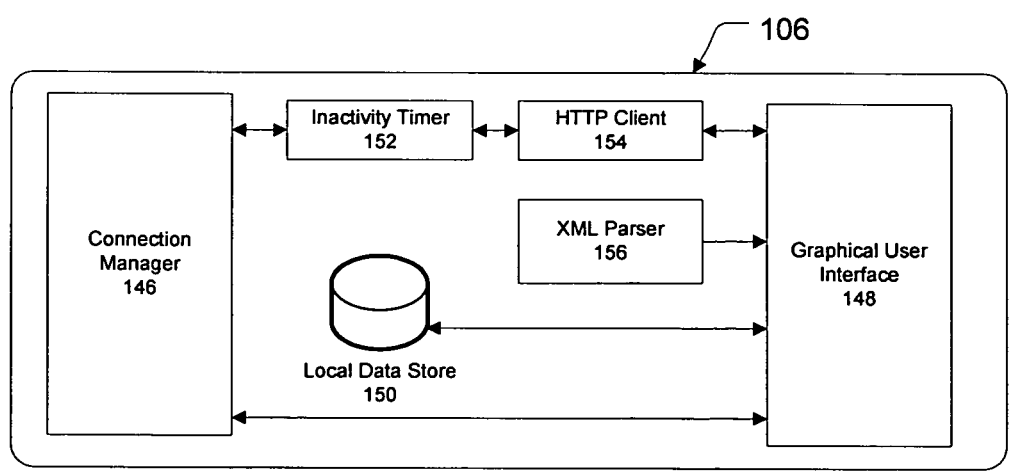
FIG. 5 illustrates an exemplary transaction coordinator application.

A schematic representation of mobile IPG client application 106 according to one exemplary embodiment is shown in FIG. 5. Mobile IPG client application 106 may generally include several hardware and/or software components, such as a connection manager 146, a graphical user interface (GUIT) 148, a local data storage 150, an inactivity timer 152, an HTTP/HTTPS client 154, and an XML parser 156. Mobile IPG client application 106 may create a data connection to WSI 118 over network 110 via a connection manager 146. Mobile IPG client application 106 may send a request with HTTP/HTTPS client 154 that includes information identifying user 122, e.g., a Universally Unique Identifier (UUID) of user 122, a local time and a query. A query may include a query type, e.g., any type specified above or other known query type, and an implicit amount of data that mobile IPG client application 106 is ready to process at a time, e.g., a page size. A screen size of mobile device 108 may be taken into account by mobile IPG client application 106 when submitting queries and receiving search results, wherein mobile IPG client application 106 requests a level of detail for a given query that mobile device 108 is generally capable of displaying. A page size may also depend on available memory in a local data store 150 of mobile device 108. For queries requesting scheduling information, e.g., channel schedule, actor search, etc., mobile IPG client application 106 may specify a time interval which will fit within a screen of mobile device 108 instead of a page size. For queries returning a list, e.g., an available channel query, page size may simply include a list size which will fit on a screen of mobile device 108.

Mobile IPG client application 106 may include an inactivity timer 152 to minimize interference of use of an IPG on mobile device 108 with other communications of mobile device 108, e.g., incoming phone calls. A typical user session may involve multiple interactions with WSI 118. While mobile IPG client application is communicating with mobile IPG data provider 104, mobile device 108 may not be able to receive incoming voice calls. Accordingly, inactivity timer 152 may be employed to interrupt a connection between mobile device 108 and mobile IPG data provider 104 after a period of inactivity by user 122. Inactivity timer 152 may begin after the mobile IPG client application 106 displays IPG data on a screen of mobile device 108. Inactivity timer 152 may expire after any desired period, e.g., after sixty (60) seconds. Each time user 122 interacts with mobile IPG client application 106, e.g., scrolling, changing screens, selecting menu items, etc., inactivity timer 152 may be reset. If user interaction ceases and the predetermined time period expires, inactivity timer 152 transmits a signal to connection manager 146 to deactivate the connection. Accordingly, mobile IPG client application 106 may allow incoming voice calls to mobile device 108 during periods of inactivity by user 122.

Mobile IPG client application 106 may maintain local data store 150, as described above. Mobile IPG client application 106 may save a list of favorite queries of user 122 within local data store 150, e.g., favorite channel numbers, actors, or programs. Accordingly, a list of favorite queries may be recalled by user 122 by selecting a favorites query from GUI 148. Mobile IPG client application 106 may also implement a local caching policy, as is generally known for various computing systems. Each new query string manually entered in by user 122 may be saved in local data store 150. User 122 may be presented with a list of recent queries when user 122 begins entering a search string and may be allowed to select a saved query from the list maintained in the cache. This approach generally minimizes the required user input. A list of recent searches in local data store 150 may be ordered according to a most recently used criterion, alphabetically, or any other method convenient.

Figure 6:
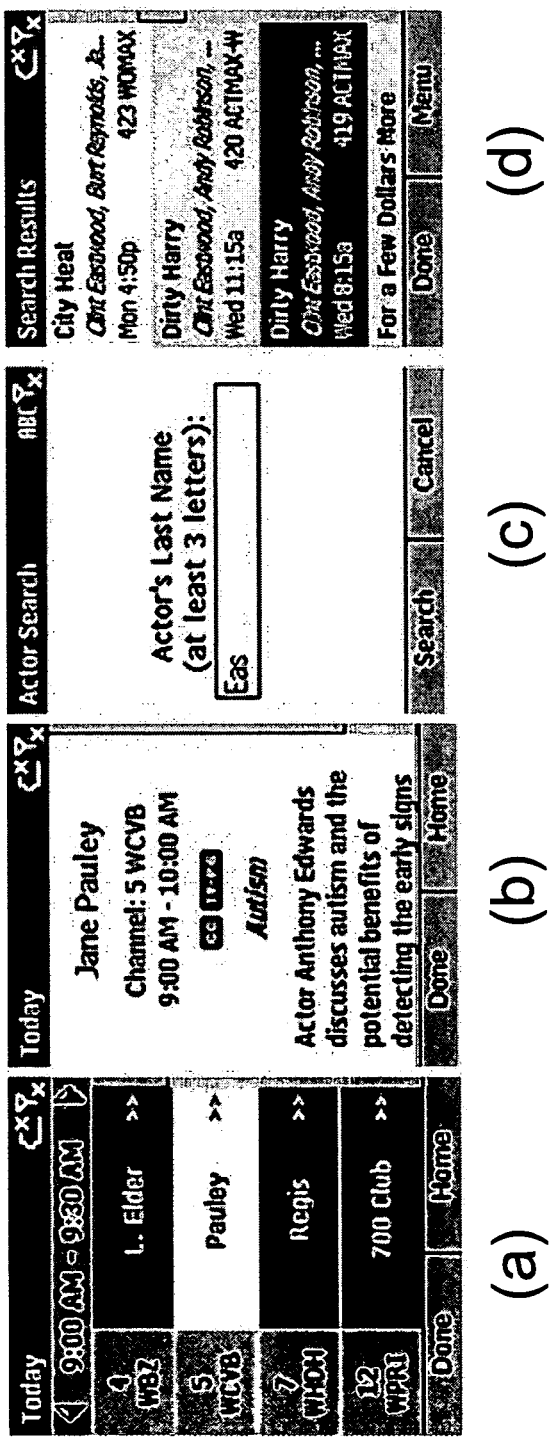
FIG. 6 illustrates an exemplary IPG displayed on a mobile device.
Figure 7:
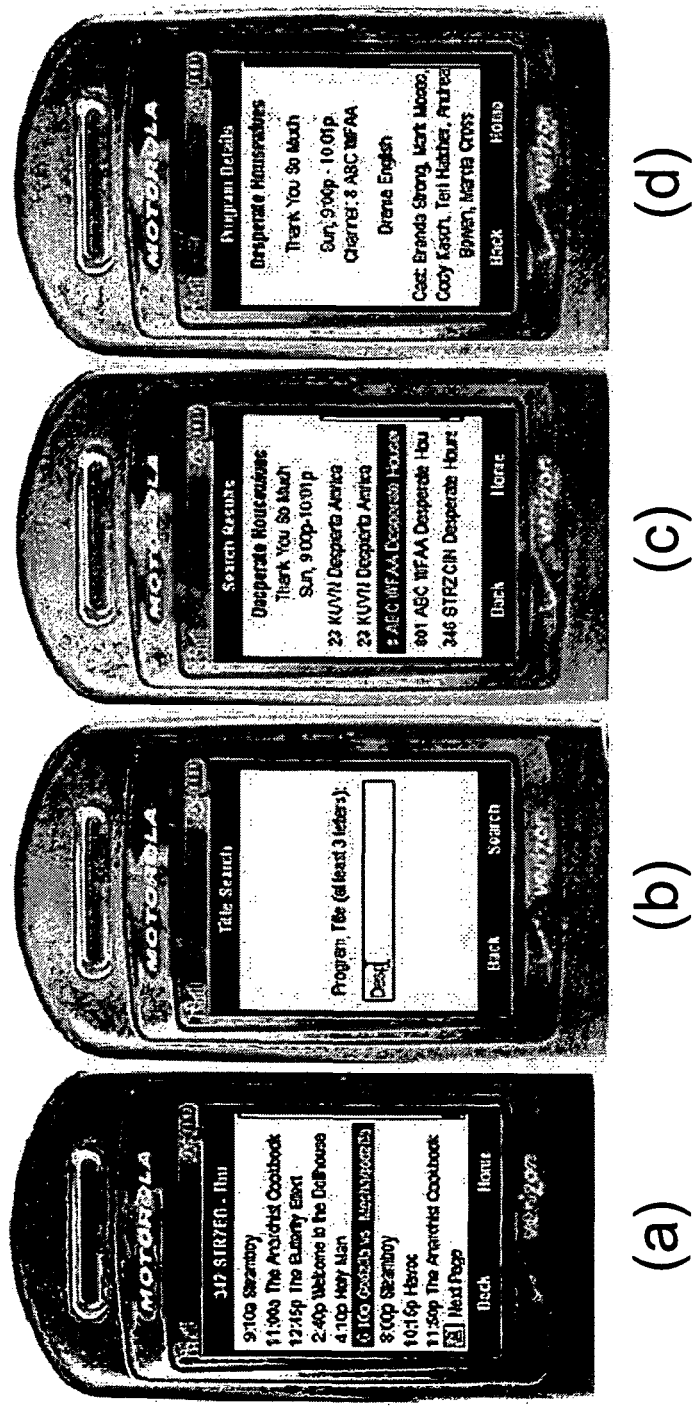
FIG. 7 illustrates another exemplary IPG displayed on a mobile device.

Mobile IPG client application 106 may thereby submit a query to mobile IPG data provider 104. After receiving a query result, mobile IPG client application 106 may employ XML parser 156 to retrieve IPG program data from local data store 150. Mobile IPG client application 106 may then display an IPG with requested program data over GUI 148, e.g., a list or grid which visually presents IPG program data to the user. Examples of IPG program data displayed on a mobile device 108 in connection with various queries described above are shown in FIGS. 6-7. FIG. 6 illustrates a Windows Mobile-based Smartphone Samsung SCH-600, while FIG. 7 illustrates a Qualcomm BREW-based Motorola E815.

System 100 may serve as a framework to deliver other known functions on the handheld device. For example, user 122 may remotely schedule a digital video recording of a selected TV program by STB and TV 140 through an IPG displayed on mobile device 108. Additionally, still images or live streaming video associated with a program may be displayed to user 122 on mobile device 108.

Turning now to FIG. 8, an exemplary process 200 for providing an IPG to a mobile device is shown. Process 200 begins at step 202, where a network component provides mobile IPG client application 106 to mobile device 108. For example, mobile device 108 may download mobile client application 106 from a server in communication with mobile IPG data provider 104, as described above.

Next, in step 204, a network component receives IPG data. For example, mobile IPG data provider 104 may download IPG data from TV listing data server 102, as described above.

Next, in step 206, which is optional, a network component receives an IPG data query. For example, user 122 may enter an actor search query into mobile IPG client application 106, which transmits the query to mobile IPG data provider 104, as described above. Where step 208 is not present, process 200 may proceed from step 206 to step 210.

In step 208, a network component transmits program data which is decoupled from presentation logic data to a mobile device. For example, as described above, WSI 118 may transmit program data to mobile IPG client application 106 in a format, e.g., XML data, which is readable by mobile IPG client application 106.

In step 210, mobile IPG client application 106 may format program data for a particular mobile device 108, as described above. Process 200 may then proceed to optional step 212, described below. If step 212 is not present, process 200 may terminate.

In step 212, a mobile application component displays an IPG on a mobile device. For example, mobile IPG client application 106 may display an IPG on mobile device 108, as described above. Where step 212 is included, process 200 may terminate following step 212.

Reference in the specification to "one embodiment" or "an embodiment" means that a particular feature, structure, or characteristic described in connection with the embodiment is included in at least one embodiment. The phrase "in one embodiment" in various places in the specification does not necessarily refer to the same embodiment each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a database manager having interactive program guide data, the interactive program guide data including program data and presentation logic, wherein the database manager determines if the program data is current;
   a data parser that decouples a subset of the program data from at least part of the presentation logic;
   a services interface in communication with the database manager;
   a mobile device application in selective communication with the services interface, wherein the mobile device application submits a query to the services interface; and
   a network component including at least one of the database manager and the services interface;
   wherein one of the services interface and the database manager transmits at least the subset of the program data, decoupled from the at least part of the presentation logic, to the mobile device application in response to the query, wherein the mobile device application formats the at least the subset of the program data into a format suitable for the mobile device; and
   at least one of:
      a) an inactivity timer that deactivates a communication link between the mobile device and the services interface after a predetermined time period of inactivity while allowing calls to the mobile device during the period of inactivity; and
      b) at least first and second interactive program guide databases in communication with the database manager, and a transaction coordinator in communication with the database manager and the at least first and second interactive program guide databases, wherein the transaction coordinator selectively routes database queries to the first interactive program guide database in communication with the services interface in response to a notification that the second interactive program guide database is receiving interactive program guide data; and
   wherein the mobile device application is downloadable to the mobile device from the network component.

2. The system of claim 1, further comprising:
   the at least first and second interactive program guide databases in communication with the database manager; and
   the transaction coordinator in communication with the database manager and the at least first and second interactive program guide databases,
   wherein the transaction coordinator selectively routes database queries to the first interactive program guide database in communication with the services interface in response to a notification that the second interactive program guide database is receiving interactive program guide data.

3. The system of claim 1, further including the mobile device in communication with the services interface.

4. The system of claim 3, wherein the mobile device application is supported by the mobile device.

5. The system of claim 3, wherein the mobile device comprises one of a wireless telephone and a handheld computer.

6. The system of claim 1, wherein the query includes at least one of an available channel list, a channel schedule, a program detail, and a search string.

7. The system of claim 6, wherein the search string includes at least one of only a partial program title, at least a portion of an actor name, and a program category.

8. The system of claim 1, wherein the database manager selectively downloads the interactive program guide data from a television listing data server.

9. The system of claim 1, further comprising a telecommunications network, wherein the mobile device is in communication with at least one of the services interface and the database manager via the telecommunications network.

10. The system of claim 1, further comprising a set-top box in communication with an interactive program guide data server.

11. The system of claim 1, wherein the inactivity timer deactivates a communication link between the mobile device and the services interface after a predetermined time period of inactivity while allowing calls to the mobile device during the period of inactivity.

12. The system of claim 1, further comprising a user database in communication with the database manager, the user database including information associated with a user of the mobile device.

13. The system of claim 1, wherein at least part of the program data includes XML data that is decoupled from at least part of the presentation logic.

14. A method, comprising:
   providing a mobile interactive program guide application on a network component for selective downloading to a mobile device;
   receiving an interactive program guide data query from the mobile device, the query indicating an amount of program data that the mobile device is configured to process;
   receiving interactive program guide data with the network component;
   decoupling interactive program guide data into program data and presentation logic with a raw data parser;
   transmitting the program data from the network component to the mobile device; and
   at least one of:
      (a) deactivating, using an inactivity timer, a communication link between the mobile device and a services interface after a predetermined time period of inactivity while allowing calls to the mobile device during the period of inactivity; and
      (b) selectively routing, via a transaction coordinator in communication with a database manager and at least a first interactive program guide database and a second interactive program guide database in communication with the database manager, database queries to the first interactive program guide database in communication with the services interface in response to a notification that the second interactive program guide database is receiving interactive program guide data.

15. The method of claim 14, wherein the interactive program guide data query includes one of an available channel list, a channel schedule, a program detail, and a search string.

16. The method of claim 15, wherein the search string includes at least one of only a partial program title, at least a portion of an actor name, and a program category.

17. The method of claim 14, further comprising:
   formatting the program data into a format suitable for the mobile device using the mobile interactive program guide application; and
   displaying the program data on the mobile device.

18. The method of claim 14, further comprising selectively activating a communication link between the mobile device and a web services interface.

19. The method of claim 14, further comprising storing at least one favorite query on the mobile device.

20. The method of claim 14, wherein the program data is decoupled from at least part of the presentation logic.

21. A method, comprising:
receiving an interactive program guide application at a mobile device, the interactive program guide application being available for selective downloading to the mobile device;
sending a request for interactive program guide data from the interactive program guide application on the mobile device to a network component, the request indicating an amount of program data that the mobile device is process;
receiving interactive program guide data including program data and program logic with the mobile device; and
formatting the program data into a format suitable for the mobile device, based on the amount indicated by the request, using the interactive program guide application; and
at least one of:
(a) deactivating, using an inactivity timer, a communication link between the mobile device and a services interface after a predetermined time period of inactivity while allowing calls to the mobile device during the period of inactivity; and
(b) selectively routing, via a transaction coordinator in communication with a database manager and at least a first interactive program guide database and a second interactive program guide database in communication with the database manager, database queries to the first interactive program guide database in communication with the services interface in response to a notification that the second interactive program guide database is receiving interactive program guide data.

22. The method of claim 21, wherein the request for interactive program guide data includes one of an available channel list, a channel schedule, a program detail, and a search string.

23. The method of claim 22, wherein the search string includes at least one of only a partial program title, at least a portion of an actor name, and a program category.

24. The method of claim 21, further comprising displaying the program data on the mobile device.

25. The method of claim 21, further comprising selectively activating a communication link between the mobile device and a web services interface.

26. The method of claim 21, further comprising storing at least one favorite query on the mobile device.

27. The method of claim 21, wherein the program data is decoupled from at least part of the presentation logic.

28. The method of claim 14, wherein the program data is transmitted to the mobile device as XML data.

29. The method of claim 21, wherein the amount of program data is one of a page size, a list size, a time interval, and a screen size of the mobile device.

30. The system of claim 1, wherein the mobile device application supports a plurality of query types, where the plurality of query types supported by the mobile device application depend at least in part upon a screen size of the mobile device and graphical user interface primitives supported by an operating system of the mobile device.

31. The system of claim 1, wherein the mobile device application is determines the format suitable for the mobile device according to characteristics of the mobile device including graphical user interface primitives supported by the mobile device.

32. The system of claim 11, wherein the mobile device selectively receives voice calls such that reception of voice calls is unavailable while the communication link is active and reception of voice calls is available while the communication link is deactivated.

* * * * *